J. W. ROBERTSON & A. W. A. E. VEILLARD.
APPARATUS FOR FEEDING SHEETS TO BRONZING MACHINES.
APPLICATION FILED MAR. 4, 1911.

1,060,027.

Patented Apr. 29, 1913.

Witnesses.
Alfred Kapler
Frederick Alley.

Inventors.
Joseph William Robertson
Albert William Alphonse Eugène Veillard.

COLUMBIA PLANOGRAPH CO., WASHINGTON, D. C.

# UNITED STATES PATENT OFFICE.

JOSEPH WILLIAM ROBERTSON, OF WALWORTH, AND ALBERT WILLIAM ALPHONSE EUGÈNE VEILLARD, OF ANERLEY, LONDON, ENGLAND.

APPARATUS FOR FEEDING SHEETS TO BRONZING-MACHINES.

1,060,027.

Specification of Letters Patent.

Patented Apr. 29, 1913.

Application filed March 4, 1911. Serial No. 612,392.

*To all whom it may concern:*

Be it known that we, JOSEPH WILLIAM ROBERTSON and ALBERT WILLIAM ALPHONSE EUGÈNE VEILLARD, subjects of the King of Great Britain, residing, respectively, at 81 Chatham street, Walworth, and 21 Derwent road, Anerley, both in the county of London, in England, have invented a new and useful Apparatus for Feeding Sheets to Bronzing-Machines, of which the following is a specification.

This apparatus for conveying sheets from printing machines and feeding them to bronzing machines consists of a grooved board or metal plate of suitable width according to the machine with any number of grooves according to the width of the board or plate, and a chain running in each groove with a small block rising from the chain at suitable intervals. If during the time taken between each run of the bronzer the chain travels twenty inches then the blocks on the chain would be twenty inches behind each other. The chains work on sprockets fixed to a spindle which in turn is driven by a chain from the bronzing machine. To facilitate altering the blocks on the conveying chains to feed any size sheet the main or driving spindle is fastened to the driving sprocket by means of a small ratchet wheel fastened to the spindle and a toothed pawl fastened to the driving sprocket, so that when the desired position of the blocks is obtained the pawl could be pressed down into the ratchet and fastened by means of a pin to prevent slipping. Thus fastened, the sprocket becomes fixed to the spindle.

Figure 1:
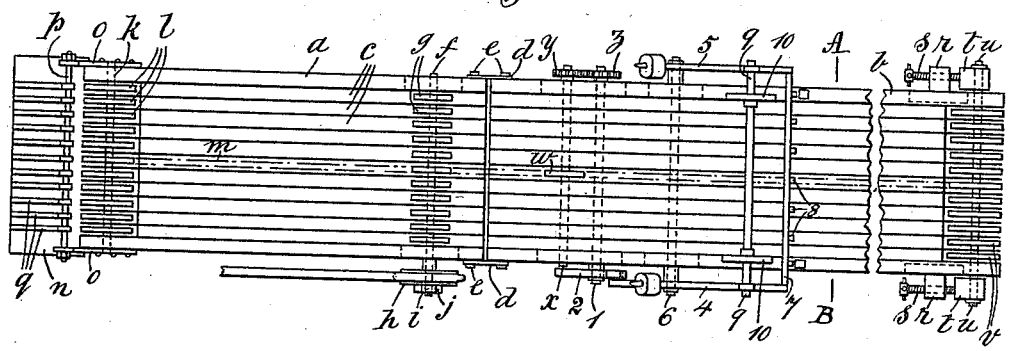
Figure 2:
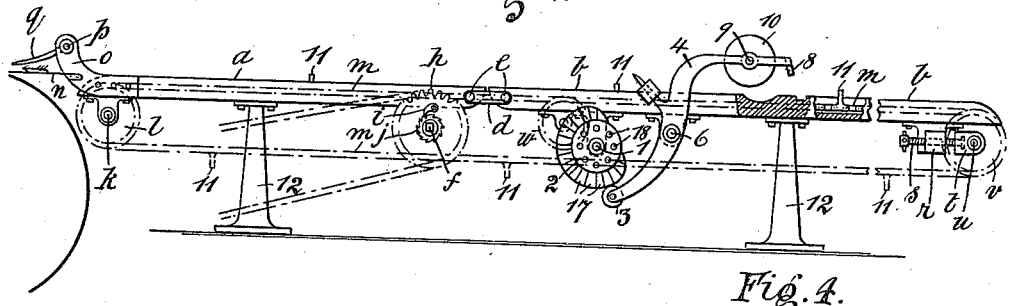
Figure 3:
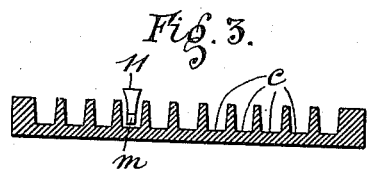
Figure 4:
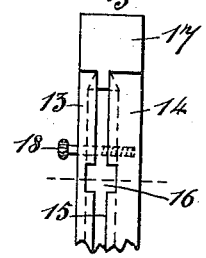

In the accompanying drawings, Figure 1, is a plan of the machine; Fig. 2, is a side elevation of Fig. 1; Fig. 3, is a section on line A B of Fig. 1, and Fig. 4, is a side elevation of the cam in detail.

We will now describe the construction of our invention as illustrated.

$a$ and $b$ are boards or metal plates cut with a number of longitudinal grooves $c$; these said boards or metal plates are connected together by links $d$ and bolts $e$. At one end of the board or metal plate $a$ is mounted the driving spindle $f$ carrying a number of sprockets $g$ over which the endless chains travel. On the end of the spindle is the driving sprocket $h$ fitted with a pawl $i$ and pinion $j$. At the delivery end of the board or metal plate $a$ is a spindle $k$ on which is mounted sprockets $l$ over which the endless chains $m$ in each groove pass.

A delivery table $n$ is attached to two side plates $o$ bolted to the sides of the board or metal plate $a$, to which is bolted a rod $p$ supporting a number of curved bars $q$ for the purpose of guiding the work above the table to the gripper of an ordinary bronzing machine.

The board or metal plate $b$ at the end is provided with two blocks $r$ with female screws to support the adjustable male screws $s$, and the bearings $t$, through which the spindle $u$ carrying the sprockets $v$ revolves. The ends of both boards $a$, and $b$, are cut away in the grooves to receive the sprockets $l$, and $v$, as shown in Fig. 1.

A sprocket $w$ is fixed to the spindle $x$ running in bearings bolted to the underside of the board $b$. This said spindle $x$ at its end carries a cog driver $y$ which engages with a cog follower $z$, for operating the spindle 1 and the cam 2. The cam 2 engages with a roller 3 mounted at the end of the lever 4. The levers 4, and 5, are pivoted to the spindle 6; these said levers are connected together by a bar 7 with stops 8, of equal length which fit in recesses cut in the ridges of the board $b$, to prevent the conveying of sheets from the printing machine to the bronzing machine if the sheet is in the wrong position. The levers also carry the spindle 9, and adjustable wheels 10, which fall into recesses cut in board $b$. The stops 8 when lowered stop the travel of the sheet if the sheet is out of position on the chains. If preferable the stops 8 may be so constructed that they fall into any of the grooves $c$, in the board $b$, which are chainless, and in that case the outside stops would be dispensed with. When the cam 2 revolves sufficiently to allow the roller 3 to move toward the center of the cam 2 for changing the motion, the wheels 10 are lowered, and if the sheet is in the correct position, the lever 4 carrying the wheels 10 is prevented from sinking to the lowest point by the contact of wheels 10 with the surface of the sheet. Should the sheet not be in the correct position, the action of lever 4 and wheels 10 is not impeded by contact with the surface of the sheet, and stops 8 are then lowered, and cause an obstruction to the passage of the sheet, until the next set of blocks 11 comes into proper position to engage the sheet, when the cam 2 comes again in contact with roller 3, raising the stops 8, and allowing the sheet in its correct position to pass.

If preferable endless chains may be used in alternate grooves, or such number of chains placed in any of the grooves as required according to the size of the work, and in that case the wheels 10 are so adjusted on the spindle 9 that they fall into the empty or chainless grooves.

In each of the endless chains m we insert blocks 11 at any suitable distance apart to suit the size of the work passing through the machine.

The boards or metal plates a, and b, are carried by vertical supports 12 which are intended to be bolted to the floor on which the machine stands.

The cam 2 is composed of a cover 13 fitted to a block 14 with a circular dovetailed groove 15 and a recess 16, to receive any number of blocks 17, the same being secured by means of screws 18 for the purpose of varying the size or shape of the cam.

We claim:

An apparatus for feeding sheets to bronzing machines, consisting of boards or metal plates cut with a number of longitudinal grooves and connected together by links and bolts, spindles fitted in bearings at each end of the boards or metal plates with sprockets mounted upon them revolving in recesses cut in the boards or metal plates allowing the passage of endless chains running in the longitudinal grooves, a main spindle driven from the bronzing machine by an endless chain and sprockets, the sprocket on the main spindle being fitted with pawls which engage a ratchet fixed to the main spindle, a spindle driven from the main spindle having a cog driver at one end driving a cog follower connected to one end of a spindle carrying a cam at its other end, the cam actuating a roller and pivoted levers carried by another spindle, the levers carrying a rod with wheels and a bar, the bar fitted with stops operating in recesses cut in the boards or metal plates, bearings for the spindles, the whole mounted on supports, substantially as set forth.

JOSEPH WILLIAM ROBERTSON.
ALBERT WILLIAM ALPHONSE
EUGÈNE VEILLARD.

Witnesses:
ALFRED HAYSLER,
FREDERICK ALLVEY.